United States Patent
Lee et al.

(10) Patent No.: US 7,130,639 B2
(45) Date of Patent: Oct. 31, 2006

(54) SERVICE SWITCHING METHOD BASED ON QOS IN A MOBILE COMMUNICATION SYSTEM

(75) Inventors: Dong-Jun Lee, Songnam-shi (KR); Jae-Ho Jeon, Songnam-shi (KR); Ji-Won Lee, Songnam-shi (KR); Sung-Kwon Jo, Seoul (KR); Seung-Joo Maeng, Songnam-shi (KR); Sung-Won Lee, Songnam-shi (KR); Sang-Hyun Yang, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 386 days.

(21) Appl. No.: 10/317,487

(22) Filed: Dec. 12, 2002

(65) Prior Publication Data

US 2003/0199278 A1 Oct. 23, 2003

(30) Foreign Application Priority Data

Dec. 12, 2001 (KR) .................. 10-2001-0078419

(51) Int. Cl.
*H04Q 7/20* (2006.01)
(52) U.S. Cl. .............. 455/452.2; 455/452.1; 455/453; 455/451; 455/509
(58) Field of Classification Search ......... 455/452.1, 455/452.2, 453, 451, 509; 370/230, 232, 370/235
See application file for complete search history.

(56) References Cited

U.S. PATENT DOCUMENTS

| 5,115,429 A * | 5/1992 | Hluchyj et al. ............. 370/231 |
| 6,345,038 B1 * | 2/2002 | Selinger ..................... 370/230 |
| 6,564,061 B1 * | 5/2003 | Guo et al. ................... 455/453 |
| 6,801,776 B1 * | 10/2004 | Notanii et al. .............. 455/451 |
| 2003/0199278 A1 * | 10/2003 | Lee et al. ................ 455/452.2 |

\* cited by examiner

*Primary Examiner*—Joseph Feild
*Assistant Examiner*—Huy Nguyen
(74) *Attorney, Agent, or Firm*—Dilworth & Barrese LLP

(57) ABSTRACT

A TDM (Time Division Multiplexing)-based mobile communication system that switches a service type according to QoS (Quality of Service). The mobile communication system includes a base transceiver system (BTS) and a mobile station (MS) connected to the BTS. The BTS monitors whether a first service provided from the BTS to the MS is satisfied according to whether at least as much data as a predetermined transmission amount is transmitted to the MS. If the first service is dissatisfied, the BTS switches a service to a second service lower in QoS than the first service so that as much data as a transmission amount smaller than the predetermined transmission amount is transmitted to the MS.

7 Claims, 6 Drawing Sheets

SERVICE SWITCHING METHOD BASED ON QOS IN A MOBILE COMMUNICATION SYSTEM

PRIORITY

This application claims priority to an application entitled "Service Switching Method Based on QoS in a Mobile Communication System" filed in the Korean Industrial Property Office on Dec. 12, 2001 and assigned Serial No. 2001-78419, the contents of which are incorporated herein by reference.

BACKGROUND OF THE INVENTION

1. Field of the Invention

The present invention relates generally to a mobile communication system, and in particular, to a method for switching a service type according to QoS (Quality of Service) in a mobile communication system supporting time division multiplexing (TDM) for a shared link.

2. Description of the Related Art

A $3^{rd}$ generation mobile communication system includes CDMA2000 (Code Division Multiple Access 2000), WCDMA/UMTS (Wideband CDMA/Universal Mobile Telecommunications System), GPRS (General Packet Radio System), and CDMA2000 1xEV-DO (Evolution Data Only) mobile communication systems. Unlike a typical $2^{nd}$ generation mobile communication system that supports only a voice service or a low-speed data service, the $3^{rd}$ generation mobile communication system supports the voice service, a high-speed packet data service, and a moving picture communication service. The mobile communication system includes a base station controller (BSC), a base transceiver system (BTS), and a mobile station (MS). The BSC is connected to the BTS by wire, and the BTS is connected to the MS through a radio channel, for communication.

In the mobile communication system, when the BSC communicates with a specified MS among a plurality of MSs through its lower BTS, the BSC sequentially transmits transmission data packets to the BTS to which the specified MS belongs. The BTS then buffers (or stores) the received data packets in its buffer, and sequentially transmits the buffered data packets to the specified MS for a time period where a radio resource is available. A technique for sharing one radio resource, or one transmission channel, by a plurality of MSs is called "time division multiplexing (TDM)."

In a mobile communication system transmitting data packets by the TDM, an operation of determining a time period for which the data packets are transmitted to MS is called "scheduling," and radio resources of the BTS are properly assigned to a plurality of MSs by the scheduling. A scheduler for the scheduling operation exists in the BTS, and the MS periodically reports the quality of a BTS signal received over a radio channel to the scheduler. The scheduler selects a particular MS, to which it will transmit data, every scheduling period, considering quality information of radio channels received from a plurality of MSs and absence/presence of data to be transmitted to each MS.

Meanwhile, a data service in the conventional mobile communication system is based on the so-called "best effort service." That is, a condition of a data service provided to a particular mobile subscriber (or MS) is determined simply based on a radio channel quality of the subscriber and availability of a radio resource with which each BTS services subscribers. Therefore, an improved mobile communication system provides differential services according to a QoS (Quality of Service) class, and guarantees a required data rate for an MS subscriber.

A radio channel quality of an MS is constantly varied according to various factors such as movement of the MS and fading. Thus, if a radio environment becomes very poor, it is not possible to support a required data rate for the MS at the start of a service. However, even in this case, the mobile communication system attempts to continuously guarantee the required data rate, thereby wasting radio resources that are assignable to other MSs.

SUMMARY OF THE INVENTION

It is, therefore, an object of the present invention to provide a method for providing a QoS (Quality of Service) required by a subscriber in a TDM-based mobile communication system.

It is another object of the present invention to provide a method for dropping a call of an MS in case of a QoS service failure.

It is further another object of the present invention to provide a method for switching a service for an MS to a non-QoS service in case of a QoS service failure.

It is yet another object of the present invention to provide a method for switching a service for an MS to a low-QoS service in case of a QoS service failure.

It is still another object of the present invention to provide a method for decreasing a required data rate for an MS in case of a QoS service failure.

It is still another object of the present invention to provide a method for restoring a QoS service of an MS, which was service-switched due to a QoS service failure.

According to a first aspect of the present invention, there is provided a method for switching a quality of a service (QoS) provided to a mobile station (MS) by a base transceiver system (BTS) in a mobile communication system including the BTS and the MS connected to the BTS. The method comprises determining whether a first service provided from the BTS to the MS is satisfied according to whether at least as much data as a predetermined transmission amount is transmitted to the MS; and if the first service is not satisfied, switching to a second service that is lower in QoS than the first service so that as much data as a transmission amount smaller than the predetermined transmission amount is transmitted to the MS.

According to a second embodiment of the present invention, there is provided a method for selecting one QoS (Quality of Service)-guaranteed mobile station (MS) among QoS non-guaranteed MSs by a base transceiver system (BTS) in a mobile communication system including one or more MSs and the BTS for guaranteeing a QoS for the MSs by transmitting as much data as a transmission amount larger than a predetermined transmission amount, or non-guaranteeing a QoS for the MSs by transmitting as much data as a transmission amount smaller than or equal to the predetermined transmission amount. The method comprises calculating a number of time slots required for transmitting as much data as the predetermined transmission amount for each of the MSs; selecting an MS having a least number of required time slots among the MSs; and restoring the selected MS for QoS guaranteeing if the number of time slots required for the selected MS is larger than the number of time slots that can be used by the MSs for the QoS guaranteeing.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, the present invention provides a method for continuously monitoring QoS service satisfaction/dissatisfaction of an MS subscriber being provided with differential services based on a QoS class (hereinafter, referred to as a QoS service) in a mobile communication system, and processing a QoS service according to a predetermined QoS failure control parameter value if it is not possible to guarantee a required data rate for the MS. More specifically, the invention provides a method for dropping a call, or switching a service to a non-QoS service or a low-QoS service, in case of a QoS service failure. The method can be performed by a scheduler in a BTS constituting a TDM-based mobile communication system.

Figure 1:
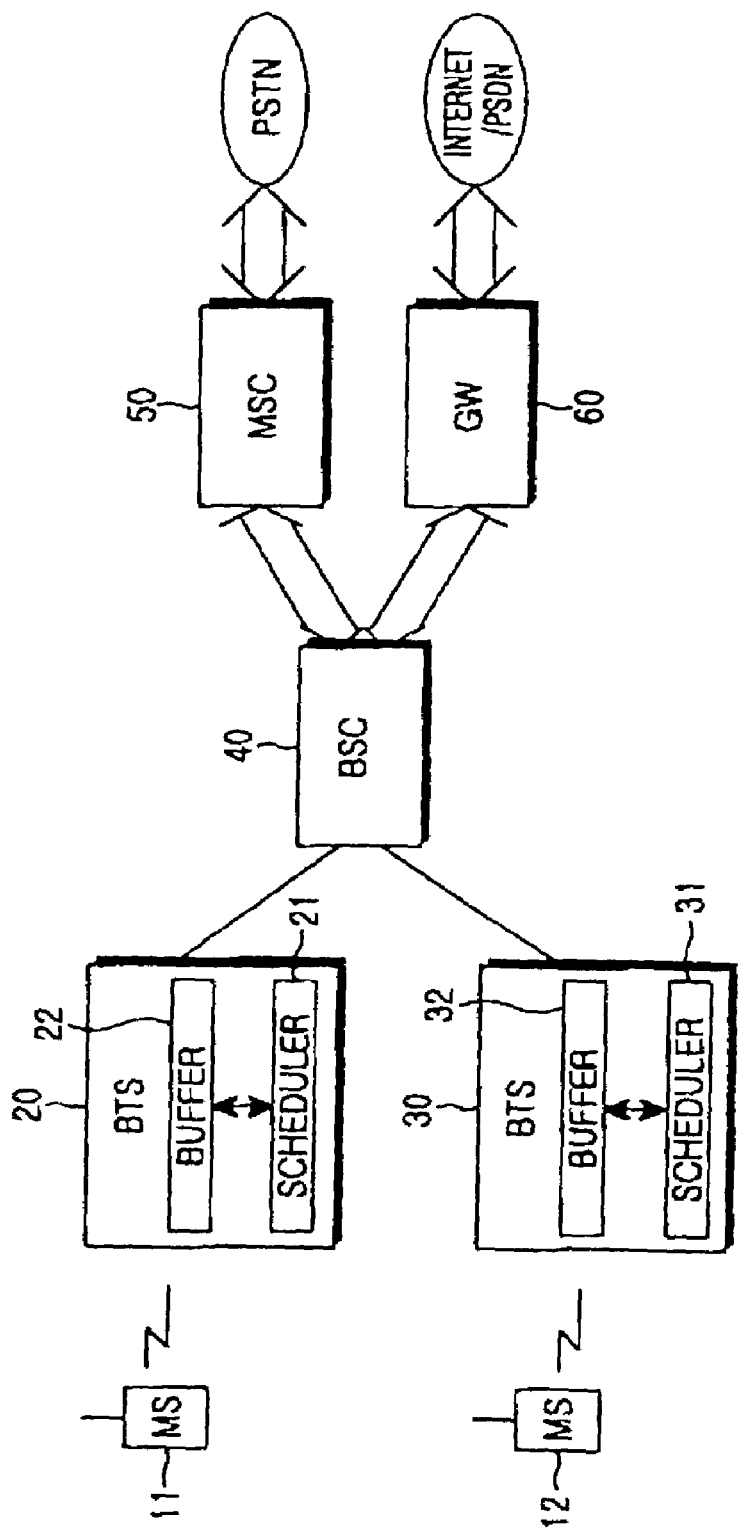
FIG. 1 illustrates a network configuration of a mobile communication system to which the present invention is applied.

FIG. 1 illustrates a network configuration of a mobile communication system to which the present invention is applied. Such a mobile communication system provides a mobile subscriber with a voice service and also a packet service.

Referring to FIG. 1, the mobile communication system includes MSs (or subscribers) 11 and 12, BTSs 20 and 30 connected to the MSs 11 and 12, respectively, and a BSC 40 connected by wire to the BTSs 20 and 30. The BSC 40 is connected to a mobile switching center (MSC) 50 and a gateway (GW) 60. The MSC 50 is connected to a circuit network such as PSTN (Public Switched Telephone Network), and the GW 60 is connected to a packet switched network such as Internet/PSDN (Public Switched Data Network). If the MS 11 is connected to the MSC 50 under the control of the BSC 40, the MS 11 is provided with a voice service, and if the MS 11 is connected to the GW 60, the MS 11 is provided with a packet data service.

FIG. 1 is a generalized network configuration of a mobile communication system, so names of the elements are subject to a change according to the type of the mobile communication system (e.g., IS-2000, WCDMA, UMTS, CDMA2000 1xEV-DO, GPRS, CDMA2000 1xEV-DV, etc.). For example, the GW 60, being a logical name, can be called packet data serving node (PDSN), access gateway (AG), or media gateway (MG). As another example, the GW 60 and the MSC 50 can be united into the same system.

In such a mobile communication system, call setup and data transmission between the MSs 11 and 12 and the BTSs 20 and 30 are performed according to a QoS class. The QoS class is determined as a band assignment class for a channel bearer and a queuing class for traffic control during initial call setup by the MS in the mobile communication system. Particularly, according to the present invention, the QoS class is determined according to a required minimum data rate for the MS, and the BTS guarantees the required minimum data rate for the MS being subscribed to the QoS service.

In order to select MSs, which are given priority in using a radio resource, according to the QoS class, it is necessary to consider QoS classes of MSs having transmission data every scheduling period. For such a QoS service and scheduling operation, the BTSs 20 and 30 include buffers 22 and 32, and schedulers 21 and 31, respectively.

Figure 2:
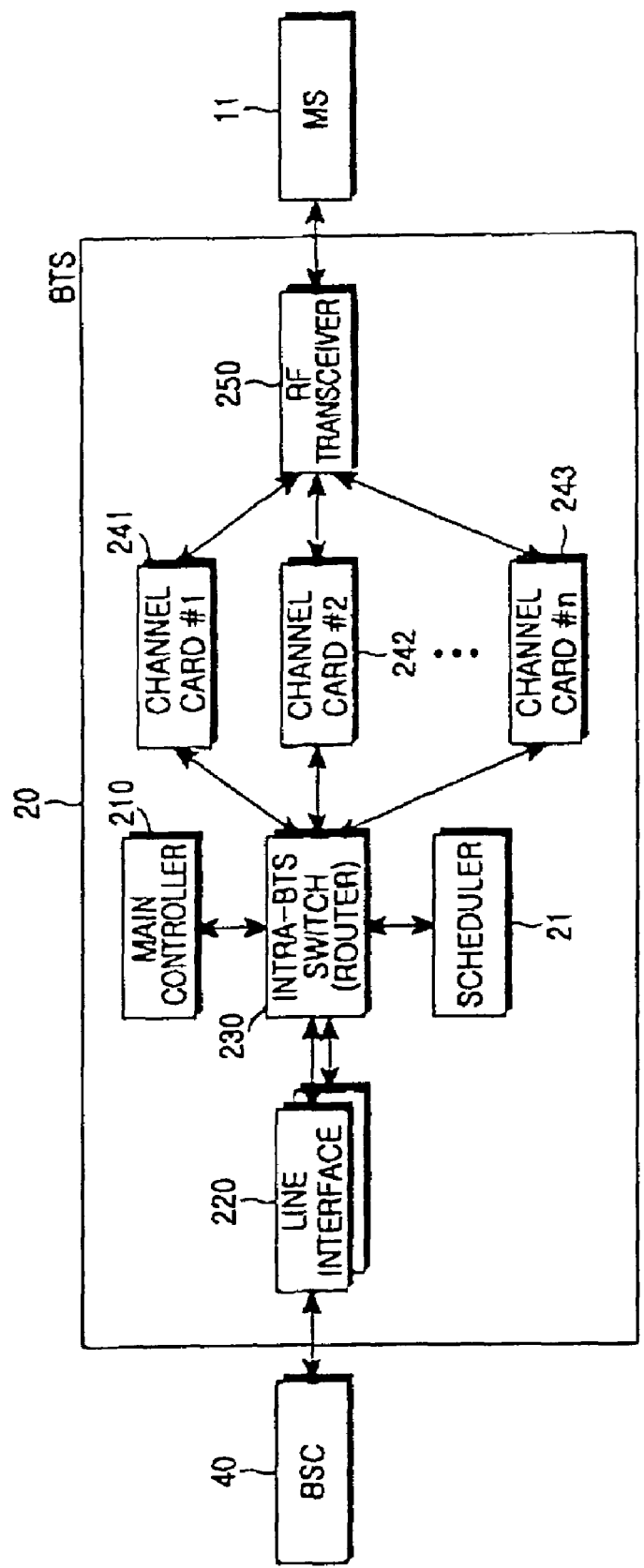
FIG. 2 illustrates a detailed structure of the BTS illustrated in FIG. 1.

FIG. 2 illustrates a detailed structure of the BTS 20 illustrated in FIG. 1. While FIG. 2 illustrates a detailed structure of the BTS 20 in FIG. 1, the BTS 30 also has the same structure.

Referring to FIG. 2, the BTS 20 includes a main controller 210, a line interface 220, an intra-BTS switch (or router) 230, channel cards 241~243, an RF (Radio Frequency) transceiver 250, and a scheduler 21. The main controller 210 controls the overall operation of the BTS 20. The line interface 220 connects the BTS 20 to the BSC 40. The RF transceiver 250 exchanges data and control signals in the form of RF signals with the MS 11. The intra-BTS switch 230 determines a traffic path in the BTS. The scheduler 21 supports efficient management of radio resources.

Figure 3:
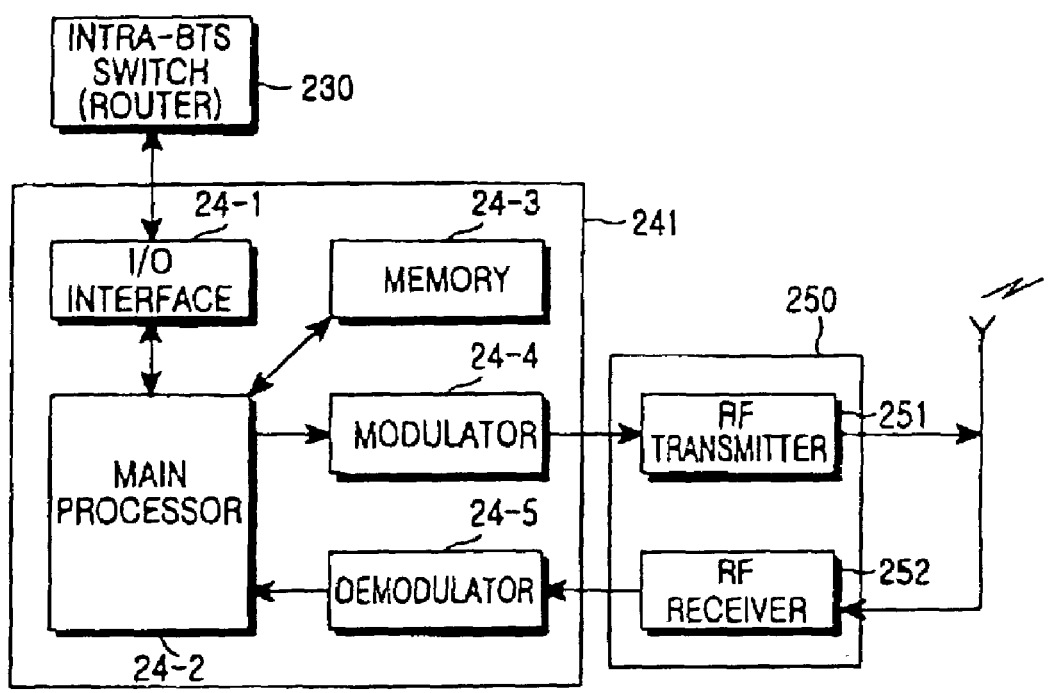
FIG. 3 illustrates a detailed structure of the channel cards illustrated in FIG. 2.

FIG. 3 illustrates a detailed structure of the channel card 241 illustrated in FIG. 2. While FIG. 3 illustrates a detailed structure of the channel card 241 in FIG. 2, the other channel chards 242~243 also have the same structure.

Referring to FIG. 3, the channel card 241 includes an input/output interface 24-1, a main processor 24-2, a memory 24-3, at least one modulator 24-4, and at least one demodulator 24-5. The input/output interface 24-1 connects the channel card 241 to the intra-BTS switch 230. The modulator 24-4 modulates data and a control signal to be transmitted to the MS 11 through an RF transmitter 251 in the RF transceiver 250. The demodulator 24-5 demodulates data and a control signal received from the MS 11 through an RF receiver 252 in the RF transceiver 250. The modulator 24-4 and the demodulator 24-5, as they form their forward and reverse channels, are also called a channel element (CE). The memory 24-3 includes an internal buffer (the buffer 22 illustrated in FIG. 2) for receiving packet data to be transmitted to the MS 11 from the BSC 40 and temporarily storing the received packet data. In addition, the memory 24-3 can store various control information.

Upon receiving a call setup request for a QoS service, the BTS 20 determines whether there is a radio resource, or a time slot, available for the channel cards 241~243. If there is no available radio resource, the BTS 20 refuses the call setup request and provides this information to the MSC 50 or the GW 60 through the BSC 40. Otherwise, if there is an available radio resource, the BTS 20 determines whether the radio resource can accept a data rate required for the QoS service.

If there is an available radio resource but the radio resource cannot accept the required data rate, the BTS 20 refuses the call setup request and provides this information to the MSC 50 or the GW 60 through the BSC 40. Otherwise, if there is an available radio resource and the radio resource can accept the required data rate, the BTS 20 assigns a channel element in response to the call setup request, and sets a link and an intra-BTS switching or routing path connected to the BSC 40. Further, the BTS 20 transmits a call setup request permit message to the MSC 50 or the GW 60 via the BSC 40.

After a call is set up in response to the call setup request, the MS 11 periodically measures a strength of a signal received from the BTS 20 over a forward link, and transmits data rate control information (DRC) corresponding to the measured signal strength to the BTS 20. The DRC is a value indicating quality information of the radio channel. This DRC is expressed in a 4-bit DRC value normally transmitted over a dedicated DRC channel, and is transmitted over the DRC channel every time slot.

Table 1 illustrates an example of DRC values transmitted over a DRC channel in a 1xEV-DO system.

TABLE 1

| Strength of Received Signal | DRC Value |
| --- | --- |
| ~–12.0 dB | 0000 |
| –12.0 ~–9.0 dB | 0001 |
| –9.0 ~–7.8 dB | 0010 |
| –7.8 ~–6.0 dB | 0011 |
| –6.0 ~–4.8 dB | 0100 |
| –4.8 ~–3.0 dB | 0101 |
| –3.0 ~0.0 dB | 0110 |
| 0.0 ~2.0 dB | 0111 |
| 2.0 ~4.0 dB | 1000 |
| 4.0 ~7.0 dB | 1001 |
| 7.0 ~10.0 dB | 1010 |
| 10.0 dB ~ | 1011 |

As illustrated in Table 1, 12-level received signals are mapped 4-bit DRC values.

Other MSs, which have set up a call in a service area of the BTS 20, also transmit DRC to the BTS 20 through the same procedure as stated above. The BTS 20 assigns a buffer to each of the MSs which have set up a call. Upon receipt of a data packet from the BSC 40, the BTS 20 determines a destination MS for the received data packet, and stores the received data packet in a buffer prepared for the determined destination MS. To this end, the BTS 20 includes as many buffers as the number of MSs that can be supported by the BTS 20.

The scheduler 21 of the BTS 20 performs period scheduling by considering DRC values collected from MSs having set up a call to the BTS 20, a required amount of transmission data (hereinafter, referred to as "required transmission amount" for short), and an amount of data to be transmitted. Here, the DRC value, a value determined depending on a channel condition between the BTS 20 and the MSs, represents a data rate. As a result of the scheduling, if data transmission to a specific MS is permitted, the scheduler 21 reads a data packet from a buffer for the corresponding MS and transmits the read data packet to a shared channel element. The data packet is transmitted to the corresponding MS over a transmission channel formed by the channel element.

A QoS service according to the present invention is performed by a scheduler in BTS. That is, the scheduler determines whether to approve data transmission, based on a required QoS class, to MSs that have requested the QoS service, and schedules data transmission to the MSs, data transmission to which is approved, every scheduling period.

To this end, the BTS determines QoS service-related parameters in the call setup procedure. The QoS service-related parameters include a "QoS service period" and a "required transmission amount." The BTS guarantees to transmit as much data as the "required transmission amount" to the MS for the "QoS service period." A value determined by dividing the "required transmission amount" by the "QoS service period" becomes a data rate required for the MS. Here, the "required transmission amount" represents a number of data packets, and the "QoS service period" can be set to about 10 or more slots by the system. In addition, the present invention additionally defines a QoS failure control parameter for making an alternative plan in case of a QoS service failure. For example, the QoS failure control parameter may have a value indicating one of a "call drop," a "non-QoS," and a "low-QoS." A detailed description of the QoS failure control parameter will be made later.

QoS service-related parameters are determined when an MS first subscribes to the QoS service, and stored in a subscriber database of a home location register (not shown) in the mobile communication system. The QoS service-related parameters stored in the subscriber database are provided to the BTS by the MSC or the GW in the call setup procedure. Alternatively, the QoS service-related parameters are determined through negotiations between the BTS and the MS in the call setup procedure.

Figure 4:
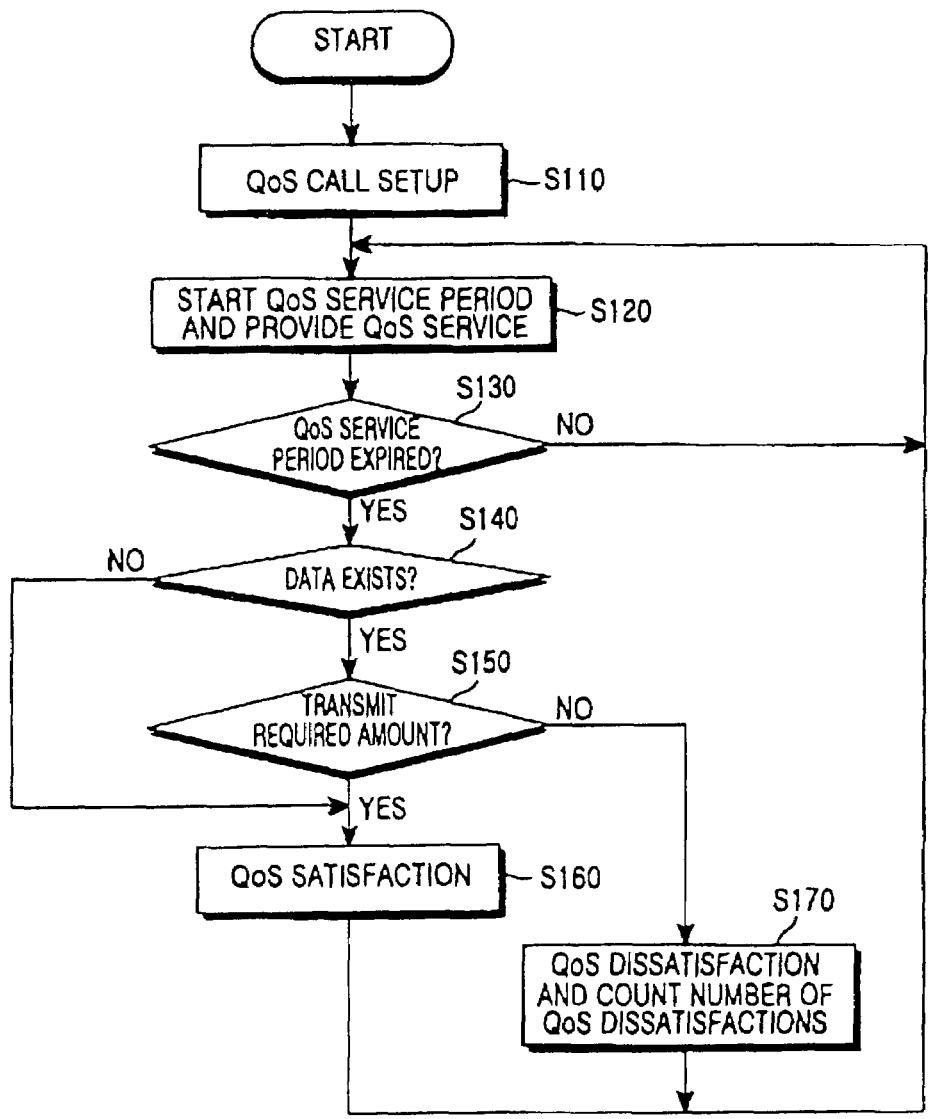
FIG. 4 is a flowchart illustrating a QoS service monitoring operation according to an embodiment of the present invention.

If a QoS service is initiated and data transmission is started, the BTS 20 (or scheduler 21 in the BTS) illustrated in FIG. 1 monitors QoS satisfaction/dissatisfaction in accordance with a procedure illustrated in FIG. 4 every QoS service period, with respect to each of the MSs in a QoS service. It will be assumed herein that the MS 11 illustrated in FIG. 1 is provided with a QoS service by the BTS 20.

FIG. 4 is a flowchart illustrating a QoS service monitoring operation according to an embodiment of the present invention. Referring to FIG. 4, if a call for a QoS service is set up between the BTS 20 and the MS 11 in step S110, the BTS 20 transmits a data packet for the QoS service to the MS 11 to which the call is set up in step S120. That is, if the buffer 22 of FIG. 1 has data to be transmitted to the MS 11, i.e., if the buffer 22 is not empty, the BTS 20 starts driving a QoS service period timer set to indicate "QoS service period" of the MS 11. After starting driving the QoS service period timer, the BTS 20 transmits data stored in the buffer 22 to the MS 11, considering the "required transmission amount" for the MS 11.

If it is determined in step S130 that the QoS service period timer has expired, i.e., the QoS service period has expired, the BTS 20 determines in step S140 whether the buffer 22 has data to be transmitted to the MS 11. If there is no data left, the BTS 20 determines a "QoS service satisfaction" in step S160, and then returns to step S120 to continuously provide the QoS service. Otherwise, if the buffer 22 has data, the BTS 20 proceeds to step S150.

In step S150, the BTS 20 determines whether it has transmitted at least as much data as the "required transmission amount" to the MS 11 for the "QoS service period." If it has transmitted at least as much data as the "required transmission amount," the BTS 20 determines the "QoS service satisfaction" in step S160. Otherwise, the BTS 20 determines "QoS service dissatisfaction" and counts the number of QoS dissatisfaction determinations in step S170.

Figure 5:
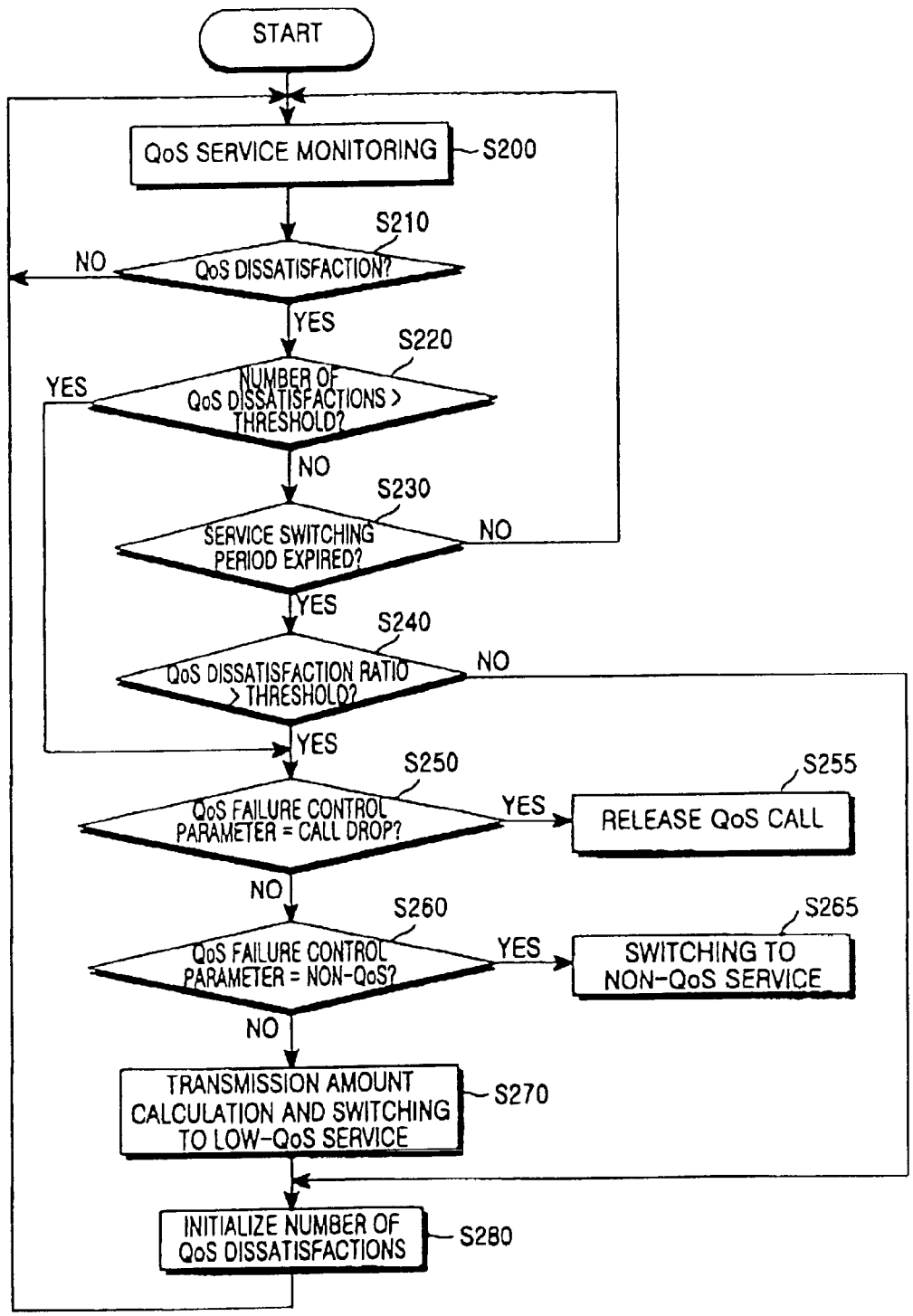
FIG. 5 is a flowchart illustrating a service switching operation according to an embodiment of the present invention.

As a result of the QoS monitoring in accordance with the procedure illustrated in FIG. 4, if the QoS dissatisfaction is determined and the QoS dissatisfaction determination satisfies a predetermined QoS failure condition illustrated in FIG. 5, a service switching operation is performed. Here, the QoS failure condition indicates that a number of continuous QoS dissatisfaction determinations is larger than or equal to a predetermined threshold, or a number of discontinuous QoS dissatisfaction determinations is larger than or equal to a predetermined threshold.

FIG. 5 is a flowchart illustrating a service switching operation according to an embodiment of the present invention. Referring to FIG. 5, the BTS 20 performs the QoS service monitoring operation of FIG. 4 in step S200, and then determines in step S210 whether the result is determined as QoS service dissatisfaction. If the monitoring result is not decided as the QoS service dissatisfaction, the BTS 20 returns to step S200 and continues the QoS service monitoring. Otherwise, if the monitoring result is determined as QoS service dissatisfaction, the BTS 20 proceeds to step S220.

In step S220, the BTS 20 determines whether the number of continuous QoS service dissatisfaction decisions is larger than a predetermined threshold. If the number of continuous QoS service dissatisfaction determinations is not larger than the predetermined threshold, the BTS 20 proceeds to step S230. However, if the number of continuous QoS service dissatisfaction determinations is larger than the predetermined threshold, the BTS 20 proceeds to step S250. In step S230, the BTS 20 determines whether a predetermined service switching period has expired. The service switching period is a QoS service monitoring period. If the service switching period has not expired, the BTS 20 returns to step S200 and continues the QoS service monitoring. Otherwise, if the service switching period has expired, the BTS 20 determines whether a ratio of the number of QoS service dissatisfaction decisions to the total number of QoS service monitoring operations for the service switching period is larger than a predetermined threshold in step S240. If it is determined in step S240 that the ratio is not larger than the predetermined threshold, the BTS 20 proceeds to step S280 to initialize (or clear) the number of QoS service dissatisfaction determinations, and then returns to step S200. Otherwise, if it is determined in step S240 that the ratio is larger than the predetermined threshold, the BTS 20 proceeds to step S250.

If it is determined in step S220 that the number of continuous QoS dissatisfaction determinations is larger than the predetermined threshold, or if it is determined in step S240 that the ratio of the number of QoS dissatisfaction determinations to the total number of QoS service monitoring operations is larger than the predetermined threshold, then the BTS 20 determines a value of the QoS failure control parameter among the QoS-related parameters determined in the call setup procedure. If it is determined in step S250 that the value of the QoS failure control parameter indicates a "call drop," the BTS 20 releases the QoS service call in step S255.

If it is determined in step S260 that the value of the QoS failure control parameter indicates a "non-QoS," the BTS 20 switches its service to a non-QoS service in step S265. That is, in step S265, the BTS 20 provides a data service by general scheduling where a QoS class (or a required data rate) is not taken into consideration, so the required data rate is not guaranteed. If the value of the QoS failure control parameter is neither a "call drop" nor a "non-QoS," the BTS 20 proceeds to step S270, determining that the value of the QoS failure control parameter indicates a "low-QoS."

In step S270, the BTS 20, determining that it cannot maintain the "required transmission amount" for the MS 11, adjusts the "required transmission amount" according to a number of its available time slots, and provides a low-QoS service to the MS 11 based on the adjusted "required transmission amount." A detailed description of step S270 will be made herein below.

The BTS 20 first calculates an average DRC Aver_DRC, using DRC values collected from the MS 11 for a predetermined time period T. In addition, the BTS 20 estimates the number Su of its available time slots for the T by subtracting the total number Sp of time slots used by all MSs connecting a call for a previous T and a predetermined slot margin slot_margin, from the total number St of slots for the T (Su=St−Sp−slot_margin). The number Su of available time slots for the T is calculated in terms of the number Sy of time slots available for the MS for the corresponding "QoS service period" (Sy=Su×"QoS service period"/T).

Based on the number Sy of available time slots for the "QoS service period" and the calculated average DRC value Aver_DRC, an amount of data that can be transmitted from the BTS to the BS for the "QoS service period" is determined. That is, an amount of data that can be transmitted to the MS is calculated by multiplying the calculated average DRC value by an amount data_slot of data transmitted for one time slot (Sy×data_slot). Here, the data amount data_slot, a value calculated by averaging the DRC values collected from QoS candidate MSs, can be defined as a value determined by multiplying a time slot value T_slot by an average DRC value. The calculated amount of data becomes a new "required transmission amount."

Since the new "required transmission amount" calculated in step S270 is calculated considering an average DRC value of the MS and the number of time slots available for the BTS, the new "required transmission amount" will always be smaller than the original "required transmission amount" in the case of a QoS service failure. Therefore, in step S270, service switching to the low-QoS service occurs.

After being switched to the low-QoS service, the BTS 20 initializes (clears) the number of QoS dissatisfaction decisions in step S280, and then returns to step S200 to continue the QoS service monitoring.

When the service switching occurs to the non-QoS service or the low-QoS service, due to QoS service failure, the corresponding MS is registered as a QoS candidate MS. This means that the MS can be restored to its original QoS service level. Here, since a plurality of QoS candidate MSs may exist in the BTS, the BTS must determine whether it can satisfy a desired QoS service level for each of the QoS candidate MSs.

Figure 6:
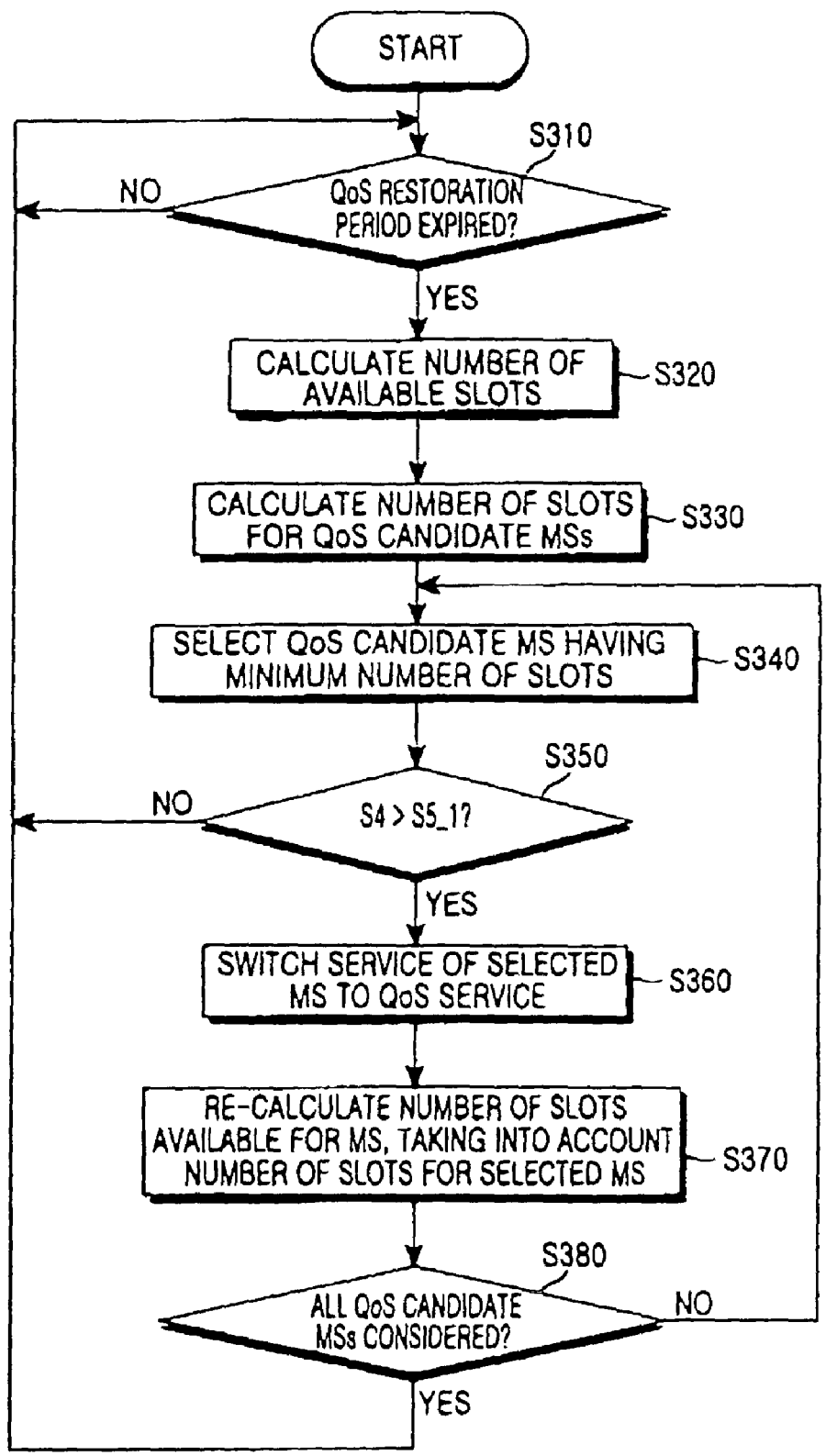
FIG. 6 is a flowchart illustrating a service restoration operation for a QoS candidate MS according to an embodiment of the present invention.

FIG. 6 is a flowchart illustrating a service restoration operation for a QoS candidate MS according to an embodiment of the present invention. Referring to FIG. 6, the BTS 20 determines in step S310 whether a predetermined QoS service restoration period has expired. If the predetermined QoS service restoration period has expired, the BTS 20 calculates in step S320 the number S1 of time slots that can be used by QoS candidate MSs for the QoS service restoration period. The number S1 of time slots available for the QoS candidate MSs is calculated by subtracting the total number S3 of time slots used for a previous QoS service restoration period and a predetermined number S_margin of margin slots, from the total number S2 of time slots for the QoS service restoration period (S1=S2−S3−S_margin). The number S1 of time slots that can be used by the QoS candidate MSs becomes the number of time slots that can be assigned to the QoS candidate MSs by the BTS 20.

The number S1 of time slots that can be used by the QoS candidate MSs for the QoS service restoration period can be calculated in terms of the number S4 of time slots available for each of the QoS candidate MSs for the corresponding "QoS service restoration period" (S4=S1×"QoS service period"/"QoS service restoration period"). An amount D of data that can be transmitted to each of the QoS candidate MSs for the corresponding "QoS service period" is defined as a value determined by multiplying the number S4 of time slots assignable for the "QoS service period" by an amount data_slot of data transmitted for one time slot (D=S4× data_slot). Here, the data amount data_slot is a value calculated by averaging the DRC values collected from the QoS candidate MSs.

In step S330, the BTS 20 calculates the number S5 of time slots required for transmitting as much data as the original "required transmission amount" for the "QoS service restoration period," for each of the QoS candidate MSs. The number S5 of time slots is calculated by multiplying an average DRC value Aver_DRC for the "QoS service restoration period" by the "QoS service period" for the "required transmission amount" (S5=Aver_DRC×"QoS service period"/"required transmission amount").

As a result of the calculation in step S330, the BTS 20 selects a QoS candidate MS having the least number S5 of time slots satisfying the original "required transmission amount," among the QoS candidate MSs in step S340. It is possible to more efficiently use resources of the BTS by first restoring the QoS service for the QoS candidate MS requiring the less number of time slots.

In step S350, the BTS 20 determines whether the number S4 of time slots that can be used by the QoS candidate MSs for the QoS service period is larger than the number S5_1 of time slots: satisfying the "required transmission amount" for the selected QoS candidate MS. Although the BTS 20 compares in step S350 the number S4 of available time slots with the number S5_1 of time slots satisfying the "required transmission amount," the BTS 20 may compare an amount of data that can be transmitted to the QoS candidate MSs with the "required transmission amount" for the MS. The amount of data that can be transmitted from the BTS to the QoS candidate MSs is calculated based on the number S5 of time slots that can be used by the QoS candidate MSs for the "QoS service period" and the average DRC value.

If S4 is not larger than S5_1 in step S350, the BTS 20 returns to step S310, determining that QoS service restoration is impossible for all QoS candidate MSs. Otherwise, if S4 is larger than S5_1, the BTS 20 service-switches the selected QoS candidate MS to a QoS service in step S360. Thereafter, in step S370, the BTS 20 updates the number S4 of time slots that can be used by the QoS candidate MSs for the QoS service period, taking into consideration the number S5_1 of time slots for the selected QoS candidate MS (new_S4=old_S4−S5_1). That is, in step S370, the number of time slots available for the BTS is calculated taking into account the number of slots for the selected MS.

In step S380, the BTS 20 determines whether all QoS candidate MSs have been considered. If all QoS candidate MSs have been considered, the BTS 20 returns to step S310. Otherwise, if there is any remaining QoS candidate MS, the BTS 20 returns to step S340, and repeats the operation in steps S350 to S380 for the remaining QoS candidate MS. If the BTS has only one QoS candidate MS, the steps S340, S370 and S380 are unnecessary.

As described above, the mobile communication system according to the present invention service-switches to a non-QoS service or a low-QoS service for an MS requiring a QoS service in case of a QoS failure, contributing to a reduction in a bad influence on other MSs in QoS service. In addition, by service-switching back to the QoS service for the QoS candidate MS, which was service-switched to the non-QoS service or the low-QoS service, it is possible to satisfy a required data rate.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for switching a quality of a service (QoS) provided to a mobile station (MS) by a base transceiver system (BTS) in a mobile communication system, the method comprising the steps of:

determining whether a first service provided from the BTS to the MS is satisfied according to whether as much data as a predetermined transmission amount is transmitted to the MS; and if the first service is not satisfied, switching to a second service being lower in QoS than the first service, according to a predetermined QoS-related parameter, wherein the predetermined transmission amount is determined by calculating an average DRC (Data Rate Control) value by collecting DRC values, determined depending on a channel condition between the BTS and the MS, from the MS for a predetermined time period, and multiplying the average DRC value by an amount of data that can be transmitted from the BTS to the MS.

2. The method of claim 1, wherein the service switching step is performed when a number of continuous determining operations, in which the first service is not satisfied, is larger than a first predetermine value.

3. The method of claim 1, wherein the service switching step is performed when a ratio of a number of determining operations, in which the first service is not satisfied, to a total number of determining operations is larger than a second predetermined value.

4. The method of claim 1, wherein the service switching step is performed when a predetermined QoS service period has expires and a ratio of the number of monitoring operations, in which the first service is dissatisfied, to the total number of monitoring operations is larger than a predetermined threshold.

5. The method of claim 1, wherein when the QoS-related parameter indicates call drop, the second service releases a call for the first service.

6. The method of claim 1, wherein when the QoS-related parameter indicates non-QoS, the second service does not guarantee the first service.

7. The method of claim 1, wherein when the QoS-related parameter indicates low-QoS, the second service guarantees that as much data as a transmission amount smaller than the predetermined transmission amount is transmitted to the MS.

* * * * *